United States Patent
Devine, II

(10) Patent No.: US 6,547,645 B2
(45) Date of Patent: Apr. 15, 2003

(54) METHOD AND BACKER INSERTS FOR BLOCKING BACKWALL WATER JET STRIKES

(75) Inventor: Robert Henry Devine, II, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/682,372

(22) Filed: Aug. 27, 2001

(65) Prior Publication Data

US 2003/0040262 A1 Feb. 27, 2003

(51) Int. Cl.⁷ .................................................. B24C 1/00
(52) U.S. Cl. ........................................ 451/40; 451/29
(58) Field of Search .............................. 451/38, 39, 40, 451/29, 36

(56) References Cited

U.S. PATENT DOCUMENTS

| | | | | |
|---|---|---|---|---|
| 4,612,737 A | * | 9/1986 | Adee et al. | 451/29 |
| 4,698,939 A | * | 10/1987 | Hashish | 451/87 |
| 5,140,127 A | * | 8/1992 | Stroud et al. | 219/121.71 |
| 5,591,002 A | | 1/1997 | Cunha et al. | |
| 5,773,790 A | | 6/1998 | Moore et al. | |
| 5,980,209 A | | 11/1999 | Barry et al. | |
| 6,139,303 A | | 10/2000 | Reed et al. | |
| 6,183,347 B1 | * | 2/2001 | Shaw | 451/36 |
| 6,224,361 B1 | | 5/2001 | Reed et al. | |

FOREIGN PATENT DOCUMENTS

JP 404261774 * 9/1992 ................. 451/38

OTHER PUBLICATIONS

Schilke et al; 39$^{th}$ GE Turbine State–of–the–Art Technology Seminar; "Advanced Gas Turbine Materials and Coatings"; Aug. 1996; pp 1–6.

* cited by examiner

Primary Examiner—Robert A. Rose
(74) Attorney, Agent, or Firm—Nixon & Vanderhye PC

(57) ABSTRACT

A method of drilling holes in an component, such as a turbine airfoil or bucket platform, the method including disposing a protective insert including a water jet blocking material adjacent a backside of the structure to be drilled and water jet drilling at least one hole in the structure, through to the backside. In one embodiment, the jet blocking material is comprised of carbide or a similar material that is more resistant to water jet drilling forces than the structure being drilled.

12 Claims, 6 Drawing Sheets

METHOD AND BACKER INSERTS FOR BLOCKING BACKWALL WATER JET STRIKES

BACKGROUND OF INVENTION

Airfoils of turbine blades and vanes of gas turbine engines often require a complex cooling scheme in which cooling air flows through the airfoil and is then discharged through carefully configured cooling holes in the side wall of the airfoil and/or its associated structures. The performance of a turbine airfoil is directly related to the ability to provide uniform cooling of its external surfaces. Consequently, control of cooling hole size and shape is critical in many turbine airfoil designs, because the size and shape of the opening determines the amount of flow exiting a given opening, its distribution across the surface of the component, and the overall flow distribution within the cooling circuit that contains the opening. Other factors, such as back flow margin (the pressure differential between the cooling air exiting the cooling holes and combustion gas impinging on the airfoil) are also affected by variations in opening size.

Conventional hole drilling techniques include laser machining and electrical-discharge machining (EDM). These techniques yield airfoil castings with dimensionally correct openings in order to repeatably control opening size.

Water jet drilling is another versatile drilling method for precision drilling operations. However, conventional water jet drilling is primarily performed on structures that do not have a shallow drop through region. This is due to the physical limitations of being able to stop the drilling jet before it hits an opposing surface. While sacrifices could be made to allow for the opposing wall to be part-drilled, this would necessarily result in a decrease in part life and field performance. Such a sacrifice is illogical where other drilling techniques that do not decrease part life are available. Thus, water jet drilling is generally considered unsuitable for drilling nozzles and buckets. Nevertheless it would be advantageous to provide a method for drilling airfoil cavities with a water jet in a manner that avoids damage to an adjacent wall, once the hole has been drilled through and before the application of the jet is terminated.

SUMMARY OF INVENTION

The invention is embodied in a method for water jet drilling structures, such as nozzles and buckets used in gas turbines, wherein the opposite wall and/or adjacent structures are shielded from the water jet by providing a backer insert as a jet-stop to prevent unwanted erosion or drilling of the airfoil structure.

In one embodiment of the invention, in order to increase the durability of the backer, the backer is at least one of formed from or coated with a material that wears at a slow rate. More specifically, any water jet blocking material that is more resistant to water jet drilling forces than the material of the structure being drilled may be used to advantage in a method and/or insert embodying the invention. An exemplary material that may be adopted for the backer of the invention is carbide. Carbide by its physical nature is slow to wear, thus offering the durability required in part to part processing in any manufacturing environment.

According to a first aspect of the invention, a method is provided for drilling holes in a wall of a component having a hollow interior cavity, the method comprising disposing a backer insert comprising a water jet blocking material in the hollow interior cavity adjacent to a back surface of the wall to be drilled; water jet drilling at least one hole in the wall through to the hollow interior cavity; and removing the backer insert.

In one embodiment, the backer insert is formed from or coated with a blocking material, such as carbide, that is more resistant to water jet drilling forces that the material of the component wall.

According to another aspect of the invention, a backer insert is provided for being disposed in a cavity of a gas turbine component to intercept and disperse a water jet for drilling of a hole through a wall of the cavity, the backer insert comprising an insert component having a configuration generally corresponding but smaller than to a configuration of a back surface of the wall of the cavity. The insert component is formed from or coated with a water jet blocking material. In one embodiment, the blocking material is more resistant to water jet drilling forces that the material of the wall being drilled.

BRIEF DESCRIPTION OF DRAWINGS

These, as well as other objects and advantages of this invention, will be more completely understood and appreciated by careful study of the following more detailed description of the presently preferred exemplary embodiments of the invention taken in conjunction with the accompanying drawings, in which.

DETAILED DESCRIPTION

The invention provides a method and backer insert to allow the use of a water jet process to drill cooling holes in airfoil walls and vane platforms by using a backer insert having a configuration generally corresponding to the back surface of the structure to be drilled, to intercept the water jet on hole completion, to prevent damage to adjacent structures.

Figure 1:
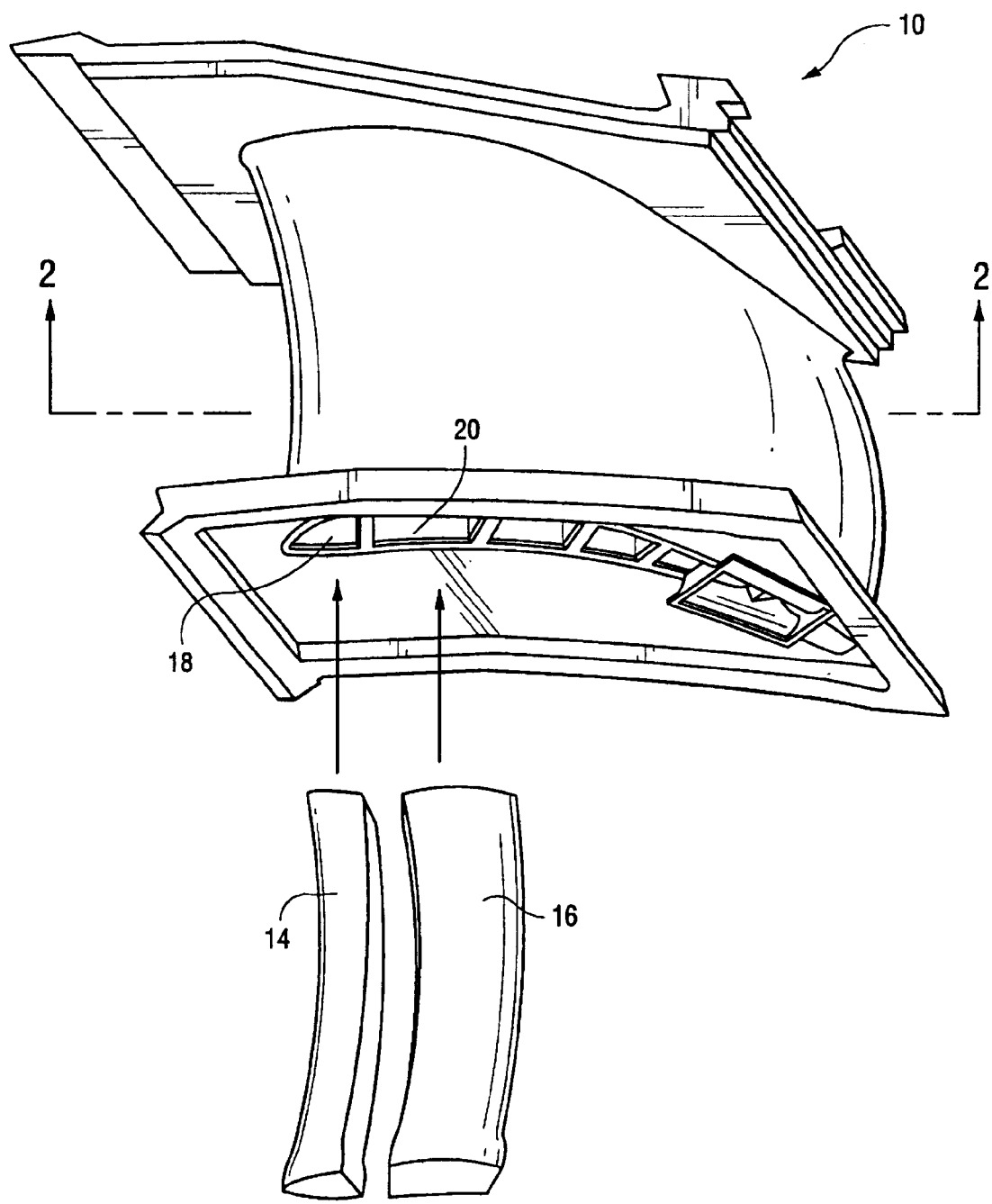
FIG. 1 is a schematic perspective view illustrating backer components provided as inserts to a nozzle airfoil.
Figure 2:
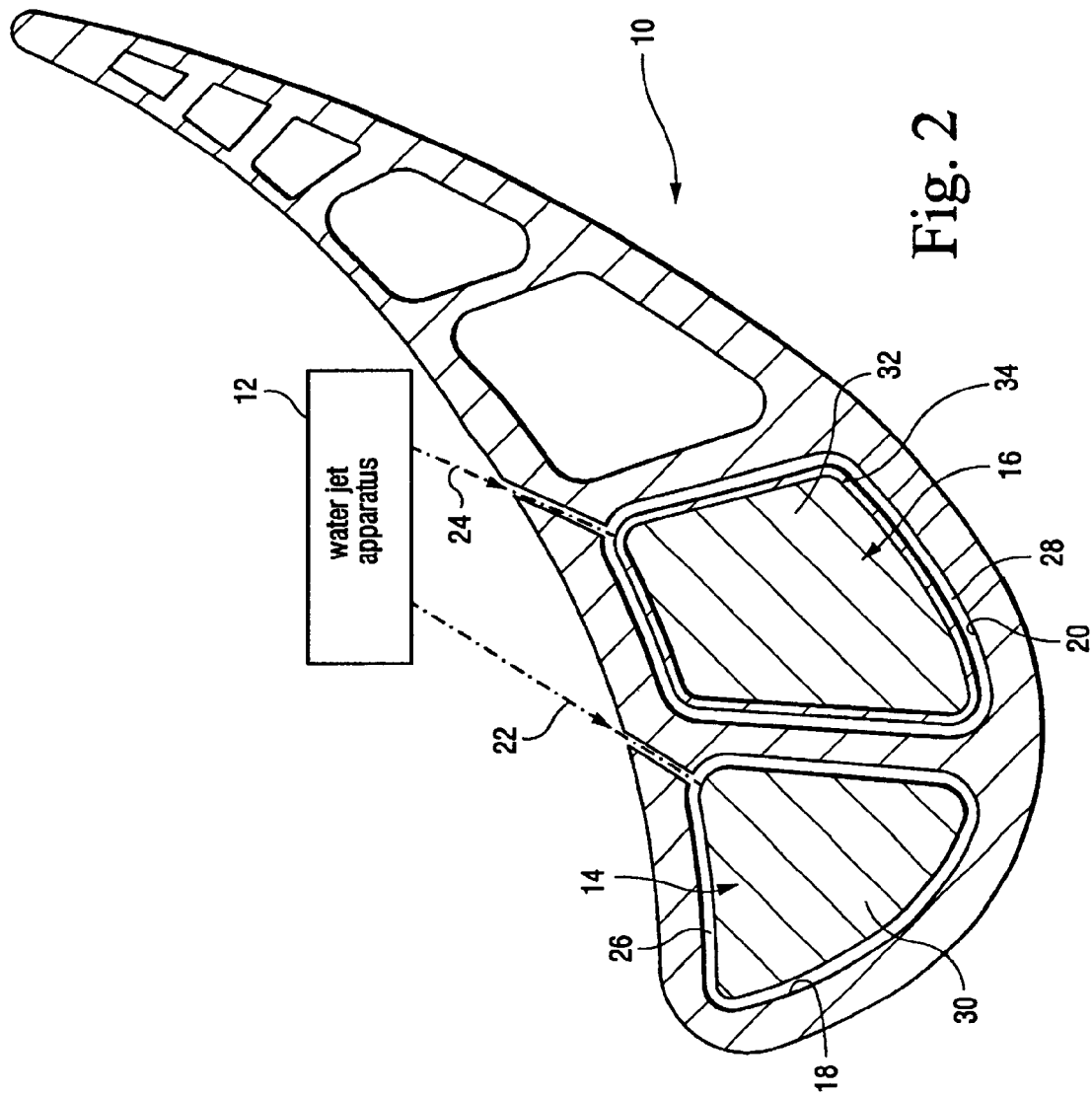
FIG. 2 is a cross-sectional view of a nozzle airfoil showing first and second backer insert components in place in respective cavities of the nozzle airfoil consistent with the backer insert placement shown in FIG. 1.

In the embodiment illustrated in FIG. 2, a nozzle 10 is being drilled using an otherwise conventional water jet apparatus schematically shown at 12. To prevent the water jet from eroded or drilling the opposite wall of the airfoil, backer inserts 14,16 are inserted into the respective cavity 18,20 of the nozzle 10 for intercepting the drilling jets 22,24 during the drilling operation. In the embodiment illustrated in FIGS. 1 and 2, the backing inserts are respectively placed inside the part during the drilling operation and removed on completion of the drilling process with respect to that cavity, or with respect to the nozzle.

As illustrated in FIG. 2, the backing inserts 14,16 are measurably smaller than their respective cavity 18,20 to define a small gap 26,28 between the backer insert and the cavity wall, to allow for the disbursal of the water jet and any added abrasive material, such as garnet, to allow a clean through hole into the cavity to be formed. The backer insert is formed from or coated with a material that is slow to wear on exposure to the water jet. Forming the backer insert from Carbide, as schematically shown at 30 and/or coating a substrate 32 with Carbide, as schematically shown by layer 34, to form the backer insert advantageously meets this criteria.

As noted, the function of the backer insert is to limit penetration of the water jet into the interior of the cavity. As such, the backer insert is advantageously placed adjacent to but spaced from the backsurface of the structure to be drilled, as described above. It is not necessary, however, for the backer insert to otherwise fill the cavity and/or to be a solid component. Thus, as an alternative to providing an insert that effectively fills the cavity but for the gap from the peripheral walls, as illustrated and described above, a hollow insert may be provided that is shaped, for example, as a conventional hollow impingement insert, but with imperforate wall(s) and formed from a water jet resistant material, as mentioned above. As a further alternative, the backer insert may be in the form of insert rod(s), tube(s), or plate(s) adapted to be disposed adjacent to but spayed from the inner wall of the structure to be drilled.

Where water jet drilling is to be performed sequentially or simultaneously on opposite side walls of the nozzle cavity, the backer insert advantageously includes wall members disposed adjacent each sidewall of the nozzle. This can be accomplished by providing a generally solid or hollow insert in the configuration of an impingement insert as described above. In the alternative, first and second backer insert plates may be provided and interconnected by a scaffold or other transverse support structure to define e.g., an I beam type assembly. By providing plates that are pivotally attached to the transverse support structure, and/or by providing a transverse support structure that can be dimensionally adjusted to alter a gap between the backer insert plates, further versatility can be afforded for using a single backer insert in a variety of nozzle cavities. It is to be appreciated, however, that the material and weight savings achieved by providing a hollow insert or supported plates rather than a solid insert is at the expense of durability and thus life span of the component.

As illustrated in FIGS. 3–6, the process of the invention can be used as well for water jet drilling of holes in structures bordering non-cavity pockets, such as for the formation of bucket platform holes, to prevent unwanted strike of the pocket area of the shank. More specifically, a typical bucket structure 50 is schematically illustrated in the elevational views of FIGS. 3 and 4, except that a backer insert 64 is illustrated as selectively disposed in a pocket area 72 of the bucket shank. Thus, referring particularly to FIGS. 3 and 4 there is illustrated a turbine bucket 50 that includes an airfoil 52 mounted on a platform 54 that is in turn carried by a shank 56. The radial inner end of the shank carries a dovetail 58 for coupling the blade to a turbine wheel (not shown). In the illustrated embodiment, the airfoil has a compound curvature with suction and pressure sides 60,62. As such, the turbine blade structure generally corresponds to that disclosed in U.S. Pat. No. 5,980,209, the entire disclosure of which is incorporated herein by this reference.

Figure 3:
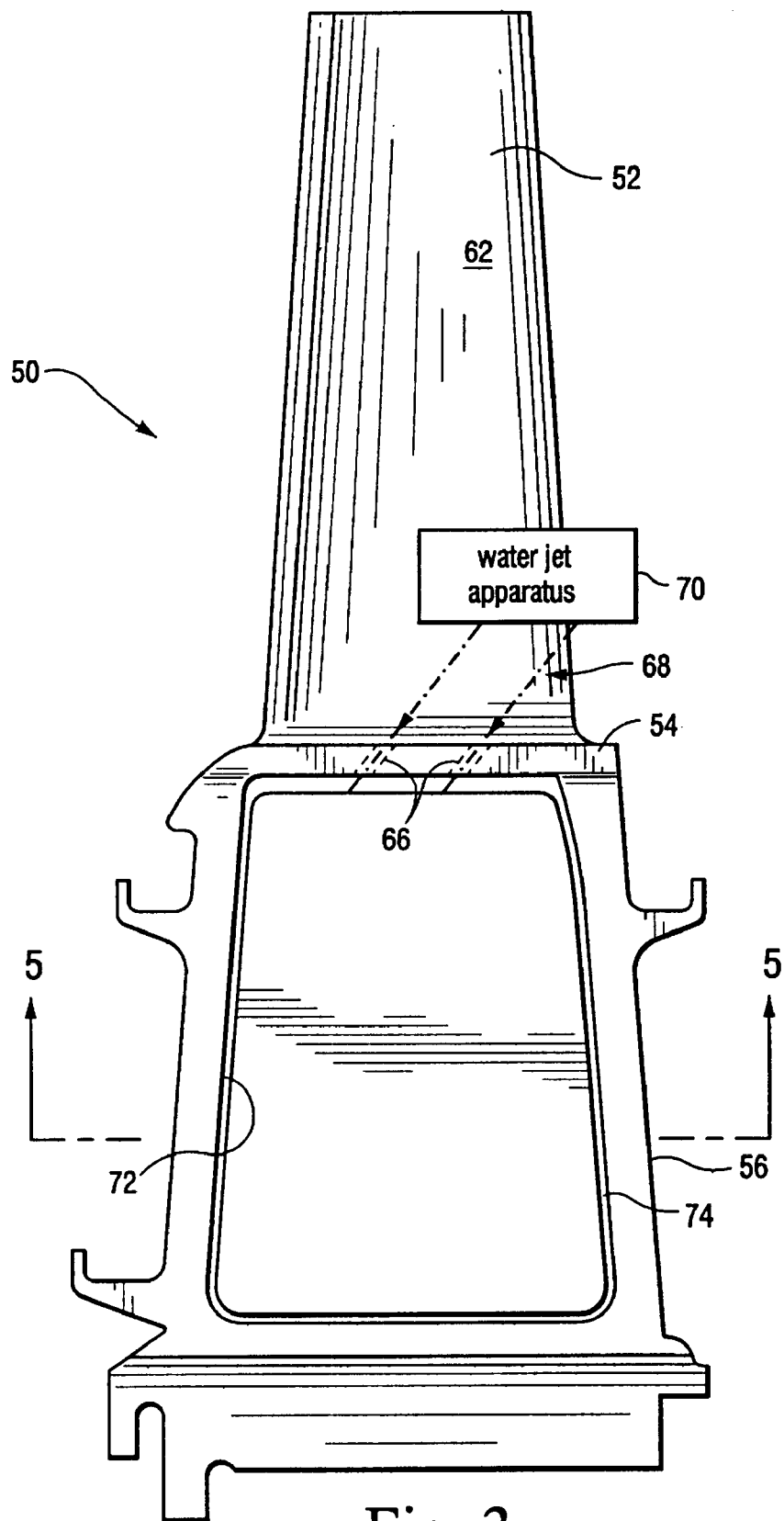
FIG. 3 is an elevational view of a bucket having a backer insert component provided in the pocket area of the bucket shank.
Figure 4:
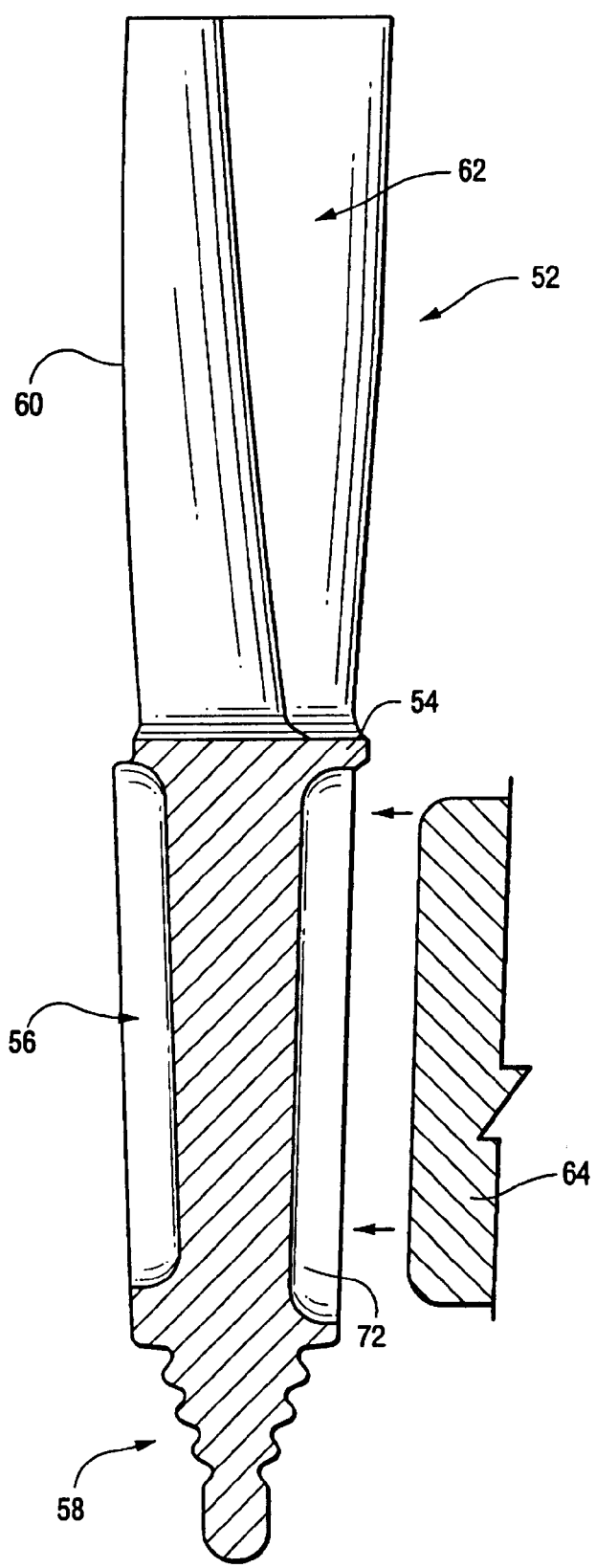
FIG. 4 is an end elevational view, partly in cross-section of the bucket of FIG. 3 showing the backer insert exploded away from the bucket shank to illustrate its placement therein.
Figure 5:
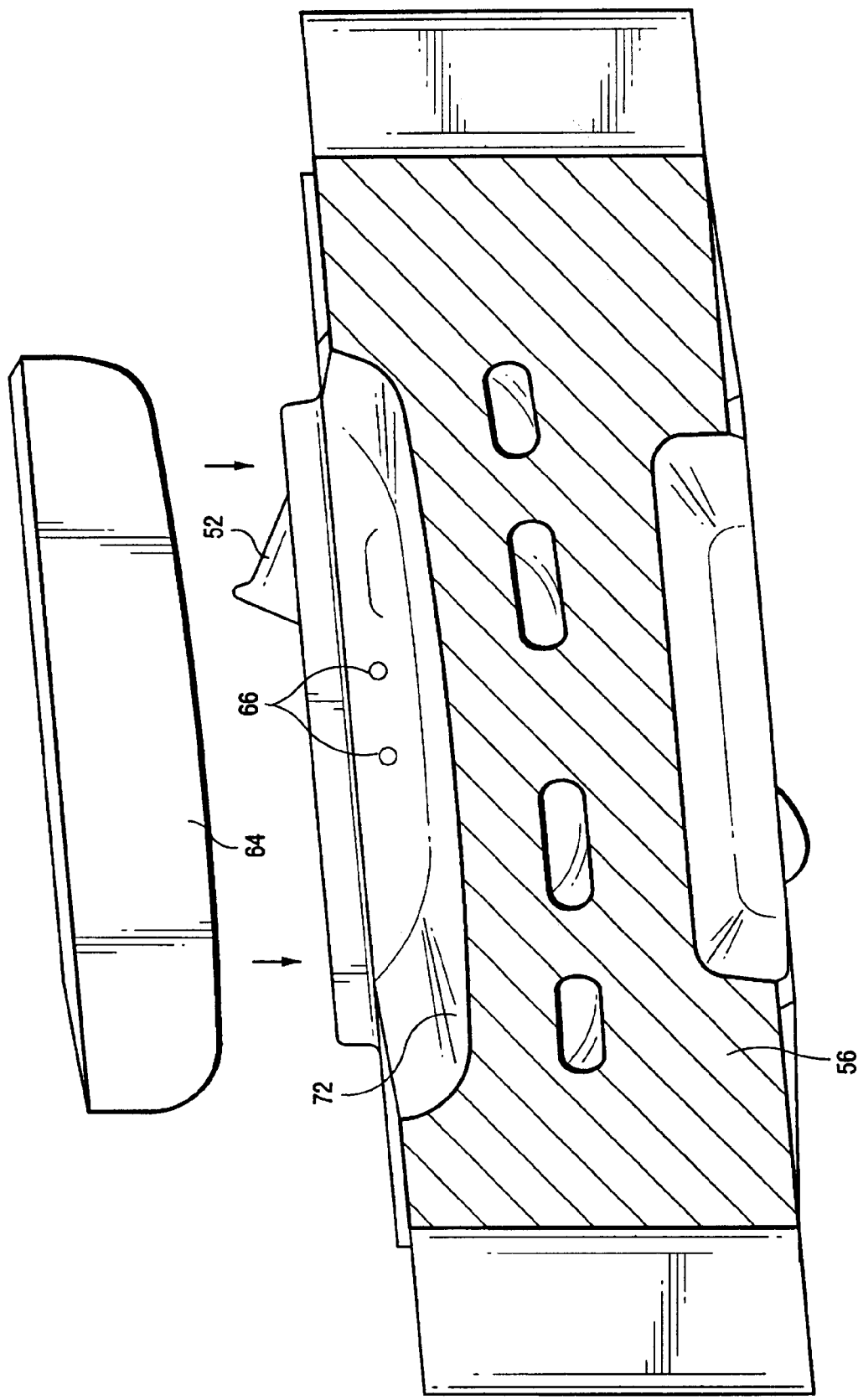
FIG. 5 is a schematic cross-sectional view taken along lines 5—5 of FIG. 3 showing the backer insert exploded away from the bucket shank pocket according to an embodiment of the invention.
Figure 6:
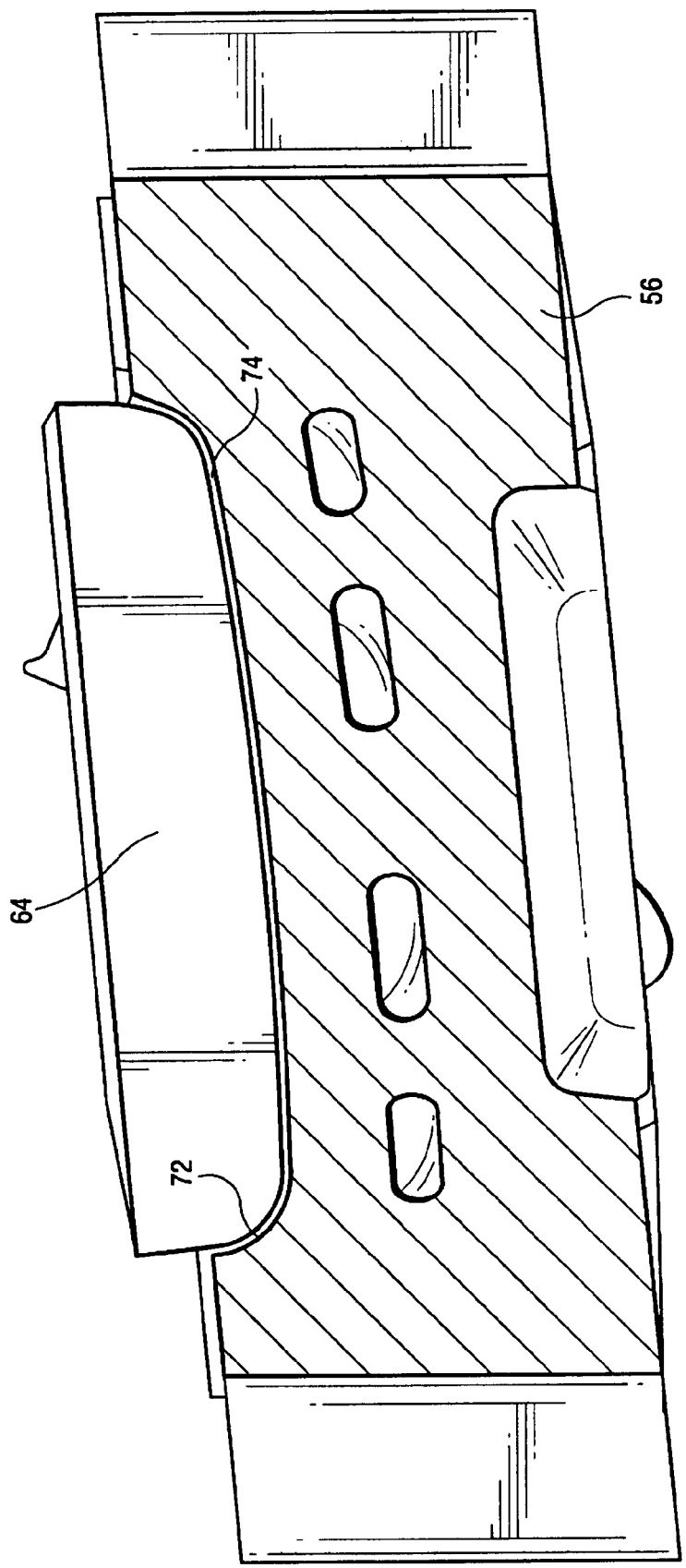
FIG. 6 is a cross-sectional view taken along lines 5—5 of FIG. 3 illustrating the backer insert in position in the bucket shank pocket.

As illustrated in FIG. 3, cooling holes as schematically shown at 66 may be formed to advantage through the platform 54 in the vicinity of the pocket area on one or each side of the airfoil 52, at its base. In an embodiment of the invention, the cooling holes are formed using drilling water jet(s) 68 generated by a water jet apparatus, schematically shown at 70. To protect the peripheral wall of the pocket area from potential damage from the drilling water jet, a backer insert 64 is selectively inserted into the pocket area 72 during the drilling operation. As illustrated in FIG. 3, the backer insert 64 may take the form of a plate or shell, or a solid insert, that is shaped to generally correspond to the shape of the wall of the pocket area 72. However, as illustrated in FIGS. 5 and 6, to facilitate flow of the fluid and debris during and following the water jet drilling process, a gap 74 is advantageously defined between the backer insert and the associated pocket area.

As such, the water jets for drilling the cooling holes, as schematically shown by dash-dot lines 68, will engage and be dissipated by the backer insert upon penetration through the bucket platform to define the air-cooling holes 66.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of forming drilled holes in a wall of a component having a hollow interior cavity, said method comprising:

disposing a backer insert comprising a water jet blocking material in said hollow interior cavity adjacent to a back surface of said wall to be drilled;

water jet drilling at least one hole in the wall through to the hollow interior cavity;

and removing the backer insert.

2. A method as claimed in claim 1, wherein said backer insert is one of formed from and coated with said blocking material.

3. A method as claimed in claim 2, wherein said blocking material is more resistant to water jet drilling forces than a material of said wall.

4. A method as claimed in claim 3, wherein said blocking material comprises carbide.

5. A method as claimed in claim 1, wherein said backer insert has a configuration generally corresponding to said back surface.

6. A method as claimed in claim 1, wherein said backer insert is disposed adjacent to but spaced from said back surface, to define a gap for fluid to flow away from said at least one hole.

7. A method as claimed in claim 6, wherein said backer insert has a configuration generally corresponding to but smaller than to a configuration of at least a part of said cavity so as to define said gap between said back surface of said wall and said insert.

8. A method as claimed in claim 1, wherein said backer insert is substantially solid and fills a substantial portion of said cavity.

9. A method as claimed in claim 1, wherein said component comprises a nozzle of a gas turbine.

10. A method as claimed in claim 1, wherein said wall is a side wall of an airfoil of said nozzle, and wherein said hollow interior cavity is a vane cavity of said airfoil.

11. A method as claimed in claim 1, wherein said component comprises a bucket of a gas turbine.

12. A method as claimed in claim 1, wherein said wall is a platform of the bucket, and said hollow interior cavity is a shank pocket of the bucket.

* * * * *

UNITED STATES PATENT AND TRADEMARK OFFICE
CERTIFICATE OF CORRECTION

PATENT NO.    : 6,547,645 B2
DATED         : April 15, 2003
INVENTOR(S)   : Devine It is certified that error appears in the above-identified patent and that said Letters Patent is hereby corrected as shown below:

<u>Column 3,</u>
Line 24, kindly delete "spayed" and insert -- spaced -- therefor.

Signed and Sealed this

First Day of July, 2003

JAMES E. ROGAN
*Director of the United States Patent and Trademark Office*